Dec. 28, 1948.                R. KISER                    2,457,682
                           TROLLEY WIRE TAP
                         Filed April 11, 1947

Inventor
Ross Kiser

By Clarence A. O'Brien
and Harvey B. Jackson
Attorney

Patented Dec. 28, 1948

2,457,682

UNITED STATES PATENT OFFICE 2,457,682

TROLLEY WIRE TAP

Ross Kiser, North Tazewell, Va.

Application April 11, 1947, Serial No. 740,884

1 Claim. (Cl. 173—273)

In the mining of coal, the coal cars are pushed by an electric locomotive from a main entry into a side entry to be loaded, whereupon the loaded cars are drawn by the locomotive from the side entry into and through the main entry to the unloading point outside the mine. When operating in the main entry, the locomotive derives its current from a trolley wire, passing only through the main entry, by the use of a retractible trolley pole. When the locomotive is moved into the side entry, a trailing cable is used to furnish current to the locomotive, said trailing cable having a wire tap or "nip" at the end which is commonly in the form of a hook adapted to be engaged over the trolley wire in the main entry. The trailing cable is payed out from a reel on the locomotive as the latter moves from the point of engagement of the tap with the trolley wire, and is wound up as the locomotive moves toward such point. As the locomotive reaches the point of engagement of the tap with the trolley wire, the motorman must remove the tap from the wire while the locomotive is in motion. However, the hook-shaped tap has often clung to the trolley wire, thereby causing many serious and fatal accidents to motormen.

The primary object of the present invention, therefore, is to prevent such accidents by providing a trolley wire tap which will effectively cling to the trolley wire when the locomotive travels in one direction to move into the side entry, and which automatically disengages itself from the trolley wire when the locomotive moves in the opposite direction past the point of engagement of the tap with the trolley wire, or after passing out of the side entry while hauling the loaded cars to the unloading point.

The exact nature of the present invention will become apparent from the following description when considered in connection with the accompanying drawing, in which.

Figure 1:
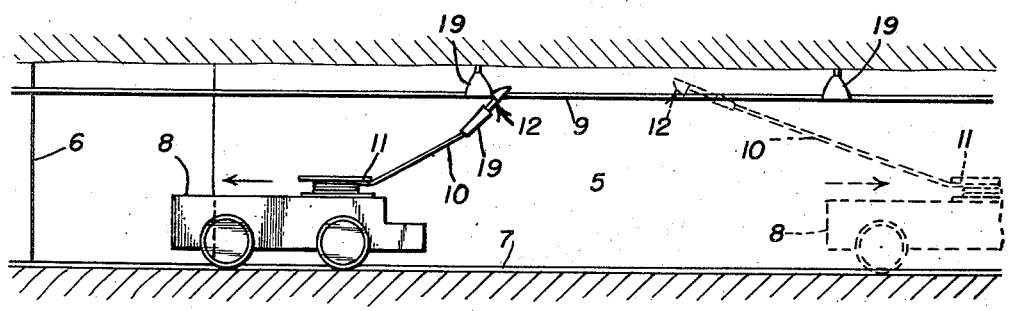
Figure 1 is a somewhat diagrammatic elevational view showing a mine locomotive whose trailing cable is equipped with a trolley wire tap constructed in accordance with the present invention.

Referring in detail to the drawing, 5 indicates the main entry of a mine and 6 a side entry thereof. Tracks 7 are ordinarily laid in the entries 5 and 6, and a locomotive 8, as well as ordinary coal cars, are adapted to travel on these tracks. Suitably suspended in the main entry 5 near its roof is a trolley wire 9 from which current is derived for operation of the locomotive 8 and by the use of an ordinary retractible trolley pole, not shown, mounted on the locomotive. The trolley wire 9 is only extended through the main entry 5, and is not extended into the side entry 6. Thus, when the locomotive is moved into the side entry 6, a trailing cable 10 is used to furnish current to the locomotive from the trolley wire 9. As usual, this trailing cable is wound upon a reel 11 and is provided at its end with a tap 12 for engagement with the trolley wire 9. When the locomotive moves into the side entry 6, the trailing cable 10 is payed out from the reel 11, and when said locomotive is moved from the side entry 6 into the main entry 5, the trailing cable 10 is wound upon the reel 11. When the locomotive 8 moves out of the side entry 6, in hauling loaded cars through the main entry 5 to an unloading point outside of the mine, the motorman ordinarily disengages the tap 12 from the trolley wire 9 while the locomotive is in motion. However, when using a tap of common form in the nature of a hook, such tap has often clung to the trolley wire, thereby causing many serious and fatal accidents to motormen. The primary object of the present invention is to prevent such accidents by providing a trolley wire tap which will cling to the trolley wire when the locomotive moves in one direction to move into the side entry, and which will automatically disengage itself from the trolley wire when the locomotive travels in the opposite direction past the point of engagement of the tap with the trolley wire, or after passing out of the side entry while hauling the loaded cars to the unloading point.

Figure 2:
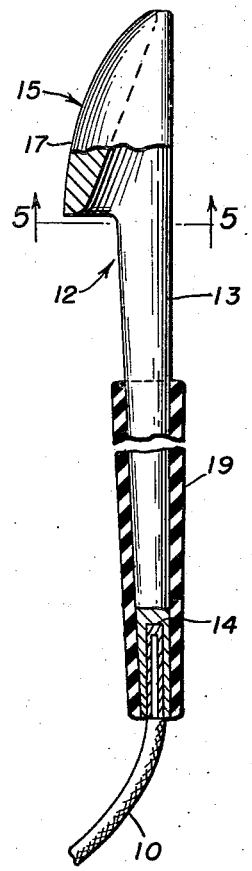
Figure 2 is an enlarged view of the tap shown in Figure 1, partly in side elevation and partly broken away and in section.

In carrying out the present invention, I provide a tap of the novel kind shown more clearly in Figure 2. As shown, this tap comprises a straight elongated shank 13 of current conducting metal, said shank being provided at its inner end with an axial socket 14 within which the exposed end of the trailing cable 10 is disposed and secured. At its outer end, the shank 13 is formed with an integral wing-like trolley wire engaging head 15 which projects laterally to one side of the shank 13 and has opposed faces 16 and 17 which are respectively of concave form and of convex form in transverse section. The concaved face 16 provides a longitudinal groove which tapers toward the outer end of the head, and the face 17 is longitudinally curved or rounded at the outer end of the head. At its inner end, the head 15 has a transverse edge 18 which is disposed and formed so as to cause the tap to remain upon the trolley wire 9 when initially engaged therewith at said edge 18. As shown, the edge 18 is preferably straight and disposed at right angles to the longitudinal axis of shank 13.

In use, the head 15 is engaged at its edge 18 upon the trolley wire 9 at one side of a hanger 19 for the trolley wire, the convex face 17 facing toward the direction in which the locomotive moves in passing from the main entry 5 into the side entry 6. As the locomotive moves into the side entry, the tap is tilted so as to engage the concave face 16 with the trolley wire. When the trolley wire is engaged in the groove of this concave face, the tap will effectively cling to the trolley wire, and the inwardly flared form of the groove in the concave face will cause the head to guide itself onto the wire even though the tap undergoes limited lateral movement. Whenever the locomotive moves out of the side entry into the main entry 5 and past the point of connection of the tap with the trolley wire 9, as in hauling loaded cars out of the mine, the tap is tilted as indicated by dotted lines in Figure 1 so as to present the convex face 17 of head 15 to the trolley wire 9. When this is done, the tap will be automatically caused to move laterally and drop off of the trolley wire by the action of gravity. Thus, the tap cannot cling to the trolley wire and cause an accident to the motorman even though the locomotive passes the point of engagement of the tap with the trolley wire in hauling the loaded cars out of the mine. Of course, the motorman could attempt to manually remove the tap from the trolley wire, but if such removal fails, the present tap will automatically disengage itself from the trolley wire.

As shown, a major portion of the shank 13 may be provided with a hand grip covering 19' of electrical insulating material so that the tap may be safely grasped for engaging the same with or disengaging the same from the trolley wire.

Figure 3:
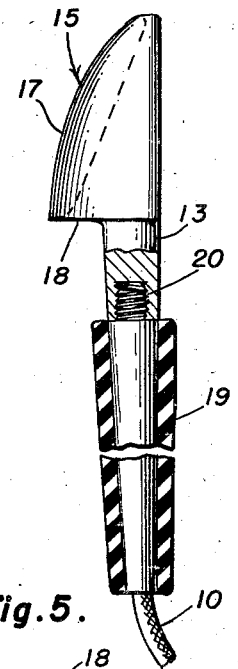
Figure 3 is a view somewhat similar to Figure 2 showing a modification.
Figure 4:
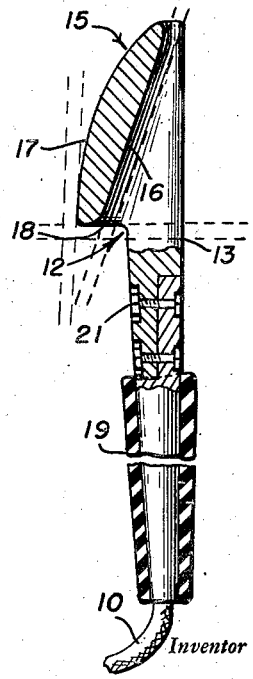
Figure 4 is a view somewhat similar to Figure 2 showing a further modification; and, Figure 5 is a transverse section taken on line 5—5 of Figure 2.
Figure 5:
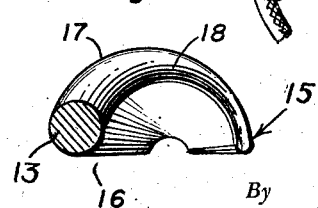

While the shank 13 may be made in one piece, it can be made of sectional form to advantage, either as shown in Figure 3 or as shown in Figure 4. In Figure 3, the sections of the shank are joined by a screw threaded connection 20 including a central stud screw on an end of one section detachably threaded into an axial socket provided in the adjacent end of the other section.

In Figure 4, the sections of the shank are halved together or provided with reduced ends which are overlapped and bolted together as generally indicated at 21. When the shank is made in separable sections as shown in Figures 3 and 4, the head end of the tap which receives the most wear or damage may be readily renewed without disturbing the connection of the inner shank section with the trailing cable. Otherwise, all forms of the invention are alike, and corresponding parts of all forms are designated by similar reference characters.

From the foregoing description, it is believed that the construction, operation and advantages of the present invention will be readily understood and appreciated by those skilled in the art. Further modifications and minor changes in details of construction are contemplated, such as fall within the spirit and scope of the invention as claimed.

What I claim is:

In a trolley wire tap, in combination, an elongated metallic shank, a metallic trolley wire engaging head rigid with and projecting laterally from one end of said shank, and means to connect a trailing cable to the other end of said shank, said head having opposite faces respectively of concave and convex form in transverse section and tapered toward the outer end of the head, the concave face being disposed at an acute angle longitudinal to the shank, whereby the head will cling to the trolley wire when tilted in one direction to engage the concave face thereof with the wire and will automatically move laterally and drop off of the wire under the action of gravity when tilted in the opposite direction to present the convex face thereof to the wire.

ROSS KISER.

REFERENCES CITED

The following references are of record in the file of this patent:

UNITED STATES PATENTS

| Number | Name | Date |
| --- | --- | --- |
| 1,027,090 | Waxbom | May 21, 1912 |
| 2,429,433 | Turner | Oct. 26, 1947 |